United States Patent
Shimizu

(10) Patent No.: US 8,537,199 B2
(45) Date of Patent: Sep. 17, 2013

(54) CAMERA CALIBRATION DEVICE AND METHOD BY COMPUTING COORDINATES OF JIGS IN A VEHICLE SYSTEM

(75) Inventor: Seiya Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 104 days.

(21) Appl. No.: 13/064,690

(22) Filed: Apr. 8, 2011

(65) Prior Publication Data

US 2011/0187816 A1    Aug. 4, 2011

Related U.S. Application Data

(63) Continuation of application No. PCT/JP2008/070135, filed on Nov. 5, 2008.

(51) Int. Cl.
*H04N 7/00* (2011.01)

(52) U.S. Cl.
USPC .................................... 348/36; 348/148

(58) Field of Classification Search
USPC ............................................. 348/36
See application file for complete search history.

(56) References Cited

U.S. PATENT DOCUMENTS

| | | | |
|---|---|---|---|
| 6,744,517 B1 * | 6/2004 | Forno et al. ............... | 356/450 |
| 7,307,655 B1 | 12/2007 | Okamoto et al. | |
| 7,500,636 B2 * | 3/2009 | Bredy ........................ | 244/3.15 |
| 7,818,127 B1 * | 10/2010 | Duggan et al. ............. | 701/301 |
| 2003/0043116 A1 * | 3/2003 | Morrison et al. ........... | 345/158 |
| 2003/0231132 A1 * | 12/2003 | Park et al. .................. | 342/357.15 |
| 2005/0179801 A1 | 8/2005 | Miwa et al. | |
| 2008/0036857 A1 | 2/2008 | Shimazaki | |
| 2008/0181488 A1 | 7/2008 | Ishii et al. | |
| 2008/0231710 A1 | 9/2008 | Asari et al. | |

FOREIGN PATENT DOCUMENTS

| | | |
|---|---|---|
| JP | 2002-135765 | 5/2002 |
| JP | 2004-004043 | 1/2004 |
| JP | 2005-217889 | 8/2005 |
| JP | 2008-187564 | 8/2008 |
| JP | 2008-187566 | 8/2008 |

OTHER PUBLICATIONS

International Search Report for PCT/JP2008/070135, mailed Jan. 20, 2009.

* cited by examiner

*Primary Examiner* — David Czekaj
*Assistant Examiner* — Leron Beck
(74) *Attorney, Agent, or Firm* — Staas & Halsey LLP

(57) ABSTRACT

A camera angle computing device includes an image acquiring unit that acquires an image containing a first jig disposed in an overlap region of an image capturing range of a camera and an image capturing range of an adjacent camera and a second jig disposed vertically below the camera; and an angle computing unit that computes an angle of the camera from coordinates of the first jig and the second jig contained in the image acquired by the image capturing unit.

9 Claims, 16 Drawing Sheets

20b MARKER  20c MARKER  20d MARKER (IMAGE COORDINATE SYSTEM)

|  | CONVERSION TABLE |
|---|---|
| COORDINATES (IMAGE COORDINATE SYSTEM) | LINE-OF-SIGHT VECTOR |
| ○, ○ | × × × |
| ○, ○ | × × × |
| ... | ... |

FIG.15
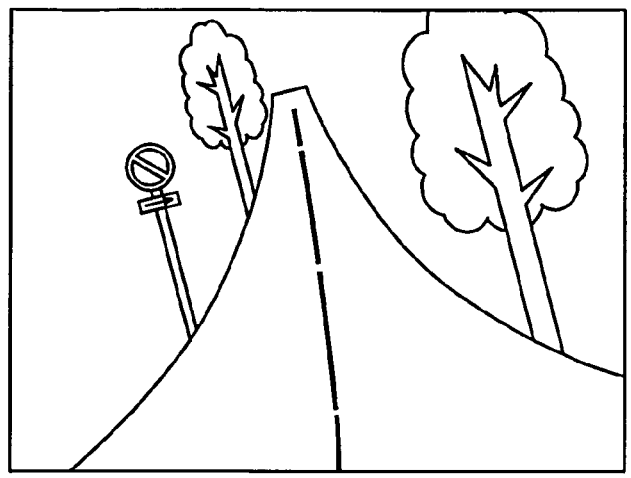
⇩ CORRECTED USING INSTALLATION PARAMETERS OF CAMERAS
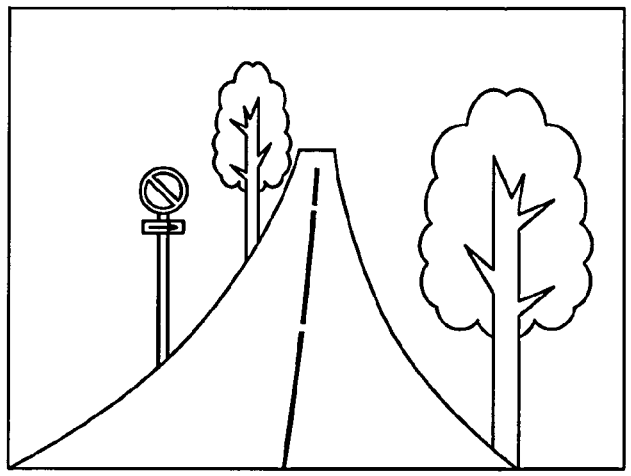

CAMERA CALIBRATION DEVICE AND METHOD BY COMPUTING COORDINATES OF JIGS IN A VEHICLE SYSTEM

CROSS-REFERENCE TO RELATED APPLICATION

This application is a continuation of International Application No. PCT/JP2008/070135, filed on Nov. 5, 2008, the entire contents of which are incorporated herein by reference.

FIELD

The embodiments discussed herein are directed to a camera angle computing device for computing the installation parameters of a camera attached to a mobile body and a camera angle computing method.

BACKGROUND

In recent image display devices that are becoming widespread, a plurality of cameras attached to a mobile body are used to capture images of the surroundings of the mobile body. The captured images are combined into a bird's eye view or a 360° panorama, and the combined image is displayed. Examples of such image display devices include parking aid systems (around view monitors) for automobiles.

When such an image display device combines the images captured by the cameras, the installation parameters of the cameras are required. Examples of the installation parameters of each camera include its position (X-, Y-, and Z-coordinates) and angles (roll, pitch, and yaw angles) in the vehicle coordinate system.

It is not necessary to very strictly determine the positions in these installation parameters (initial values measured by the user may be used). However, the angles of the cameras installed in the vehicle must be accurately determined by calibrating the cameras because the angles largely affect the final combined image even when the errors in the angles are very small.

Various techniques have been proposed to compute the angles of cameras. For example, in one known technique (see, for example, Japanese Laid-open Patent Publication No. 2008-187566), one calibration jig (calibration pattern) of a known shape is disposed on a road surface at any position in each overlap region of the fields of view of cameras (each common image capturing range of the cameras). The installation parameters of the cameras are computed using the shape conditions of the calibration patterns. Each calibration jig used in this technique has a square shape with sides of about 1 meter to about 1.5 meters, and markers are provided at the four corners of the jig.

In another known technique (see, for example, Japanese Laid-open Patent Publication No. 2008-187564), some of the installation parameters of the cameras are computed in advance by a predetermined method, and two small calibration jigs each having one characteristic point are disposed in each common image capturing range of cameras. The rest of the installation parameters are computed under the conditions in which each camera captures an image containing four markers.

However, the conventional techniques described above have a problem in that the calibration of the cameras cannot be made in a narrow space.

For example, when square calibration patterns are placed to make the calibration of the cameras, at least two calibration patterns with sides of about 1 meter to about 1.5 meters must be disposed in each common image capturing range. Therefore, to compute the installation parameters of the cameras, a space of 2 meters to 3 meters must be provided on each side of the vehicle in addition to the footprint of the vehicle.

Even when small calibration jigs are placed to make the calibration of the cameras, two calibration jigs spaced apart from each other by a certain distance must be disposed in each common image capturing range of cameras, and therefore the calibrations of the cameras cannot be made in a small space. With this technique, some of the installation parameters must be computed in advance by a different method, and this technique alone cannot compute all the installation parameters of the cameras.

Therefore, one important object is to allow the calibration of the cameras to be made even in a narrow space to determine the installation parameters of the cameras accurately.

SUMMARY

According to an aspect of an embodiment of the invention, a camera angle computing device includes an image acquiring unit that acquires an image containing a first jig disposed in an overlap region of an image capturing range of a camera and an image capturing range of an adjacent camera and a second jig disposed vertically below the camera; and an angle computing unit that computes an angle of the camera from coordinates of the first jig and the second jig contained in the image acquired by the image capturing unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 15 is a diagram illustrating examples of the images outputted from an image combining processing unit;

DESCRIPTION OF EMBODIMENTS

Preferred embodiments of the present invention will be explained with reference to accompanying drawings. In the embodiments described below, a calibration device is used as an example of the camera angle computing device. However, the present invention is not limited to the embodiments.

[a] First Embodiment

To compute the installation parameters of cameras installed in a vehicle, the calibration device according to a first embodiment uses images each including a marker (a calibration jig: the same applies to the following description) disposed vertically below a camera and markers disposed in overlap regions of the image capturing ranges of the camera and adjacent cameras. This allows a reduction in the area required for the installation of each camera and also allows the installation parameters to be accurately computed.

Figure 1:
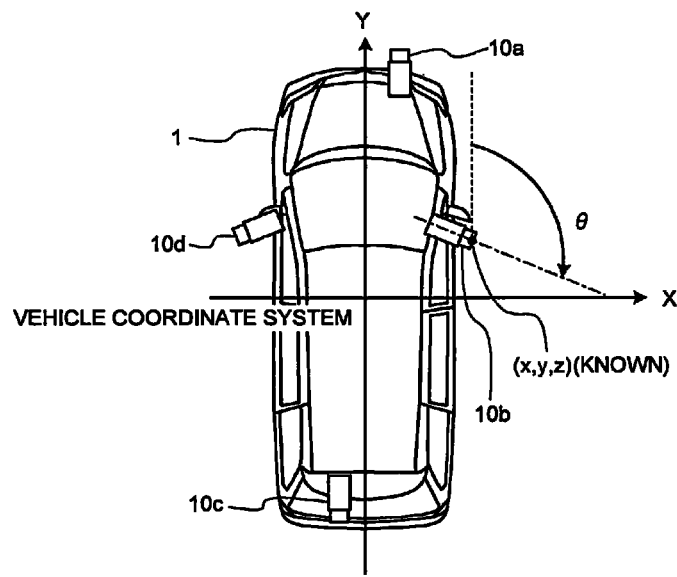
FIG. 1 is a diagram (1) illustrating the installation parameters of cameras.
Figure 2:
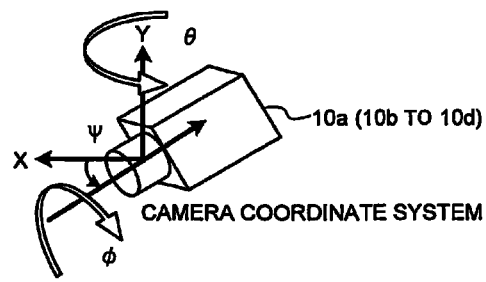
FIG. 2 is a diagram (2) illustrating the installation parameters of the cameras.

The installation parameters of the cameras will next be described. FIGS. 1 and 2 are diagrams illustrating the installation parameters of the cameras. Of the installation parameters of cameras $10a$ to $10d$, their installation positions are given as coordinates (x, y, and z) in a vehicle coordinate system relative to a vehicle 1, as illustrated in FIG. 1. In this embodiment, the coordinates of the cameras $10a$ to $10d$ are assumed to be known. In the following description, the position coordinates of the cameras are denoted as camera position parameters.

Of the installation parameters of the camera $10a$ (or any of $10b$ to $10d$), its angles in a camera coordinate system relative to the optical axis of the camera $10a$ include a rotation angle $\phi$ about the optical axis of the camera $10a$, a rotation angle $\psi$ of the optical axis of the camera $10a$ relative to the horizontal direction, and a rotation angle $\theta$ about an axis perpendicular to the ground, as illustrated in FIG. 2. In the following description, the rotation angle $\phi$, the rotation angle y, and the rotation angle $\theta$ of a camera are collectively denoted as camera angle parameters.

Figure 3:
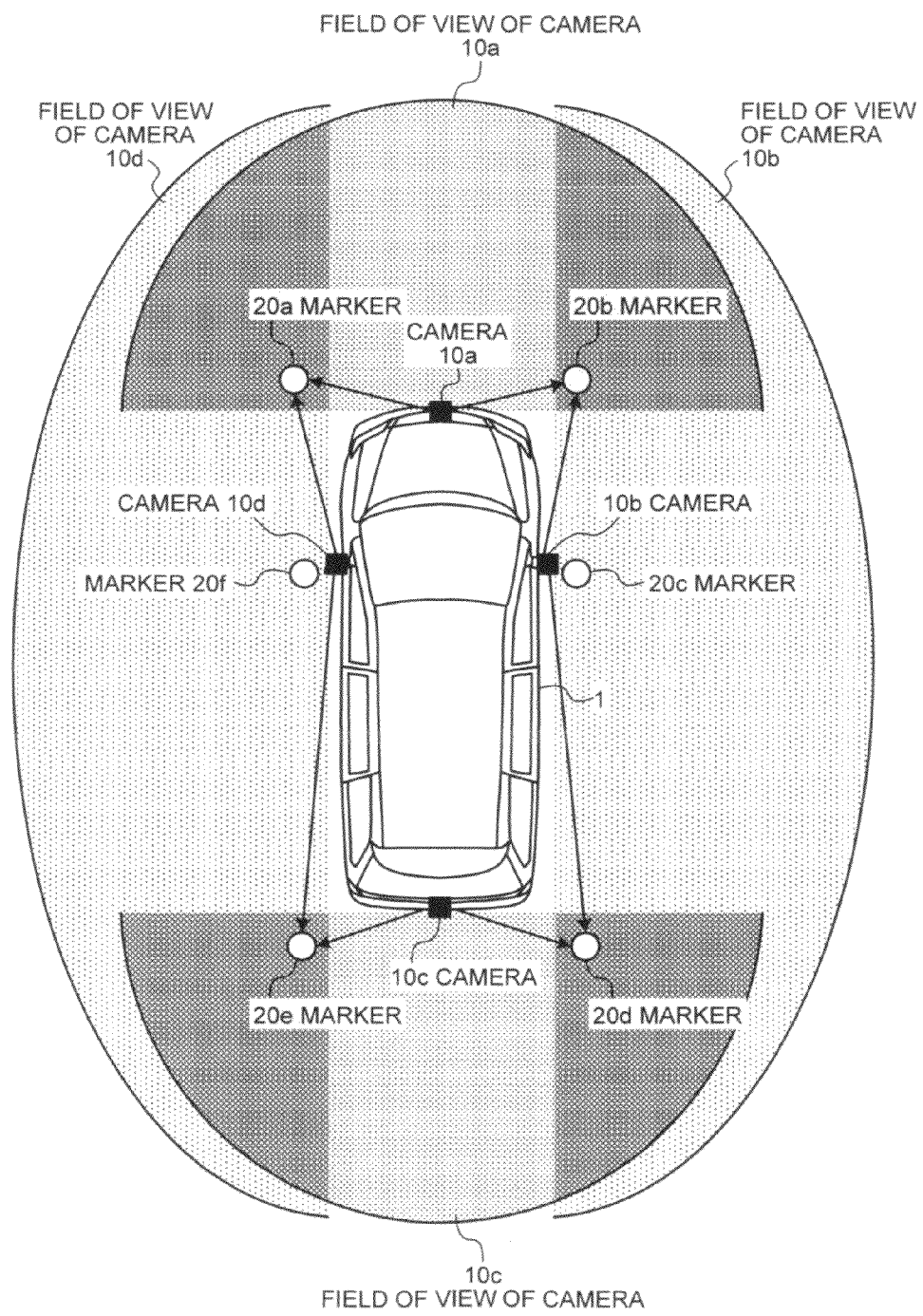
FIG. 3 is a diagram illustrating the positional relationships between cameras installed in a vehicle and markers.
Figure 4:
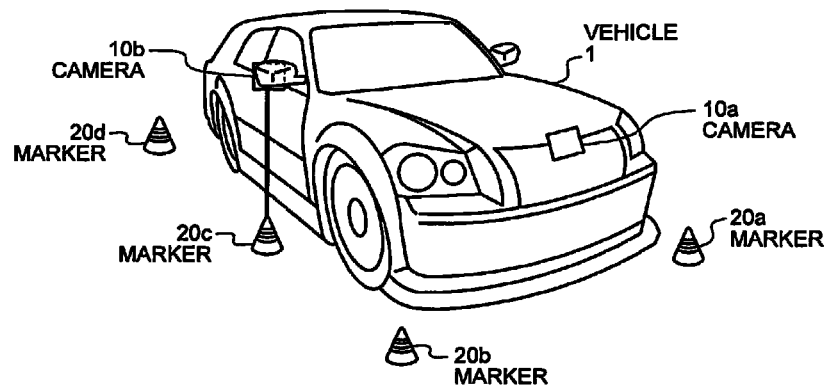
FIG. 4 is a perspective view illustrating the positional relationships between the cameras installed in the vehicle and the markers.

The positional relationships between markers and the cameras $10a$ to $10d$ installed in the vehicle 1 will next be described. FIG. 3 is a diagram illustrating the positional relationships between the markers and the cameras installed in the vehicle, and FIG. 4 is a perspective view illustrating the positional relationships between the markers and the cameras installed in the vehicle.

As illustrated in FIG. 3, a marker $20a$ is disposed in the overlap region of the fields of view (image capturing ranges: the same applies to the following description) of the cameras $10a$ and $10d$, and a marker $20b$ is disposed in the overlap region of the fields of view of the cameras $10a$ and $10b$. A marker $20c$ is disposed vertically below the camera $10b$ (at a position in a vertically downward direction extending from the optical center (lens position) of the camera $10b$) (see FIG. 4).

Moreover, as illustrated in FIG. 3, a marker $20d$ is disposed in the overlap region of the fields of view of the cameras $10b$ and $10c$, and a marker $20e$ is disposed in the overlap region of the fields of view of the cameras $10c$ and $10d$. A marker $20f$ is disposed vertically below the camera $10d$ (at a position in a vertically downward direction extending from the optical center (lens position) of the camera $10d$). The vehicle 1 and the markers $20a$ to $20f$ are assumed to be disposed on a horizontal plane.

Figure 5:
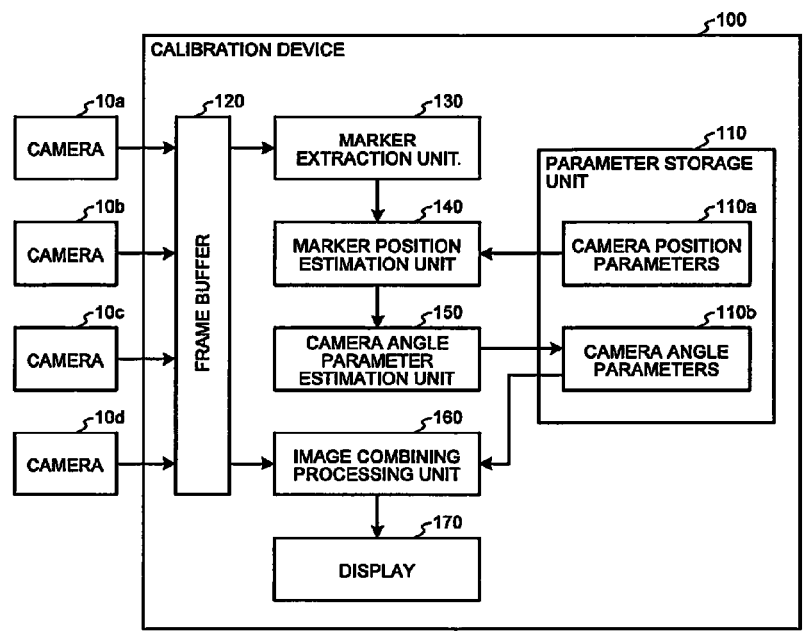
FIG. 5 is a diagram illustrating the configuration of a calibration device according to a first embodiment.

The configuration of a calibration device 100 according to the first embodiment will next be described. For example, the calibration device 100 is installed in the vehicle 1 and computes the camera angle parameters of the cameras $10a$ to $10d$. FIG. 5 is a diagram illustrating the configuration of the calibration device 100 according to the first embodiment. As illustrated in FIG. 5, the calibration device 100 includes a parameter storage unit 110, a frame buffer 120, a marker extraction unit 130, a marker position estimation unit 140, a camera angle parameter estimation unit 150, an image combining processing unit 160, and a display 170.

Of these units, the parameter storage unit 110 is a storage unit that stores various types of data used when calibration is performed. In particular, camera position parameters $110a$ and camera angle parameters $110b$, which are closely related to the present invention, are stored.

Figure 6:
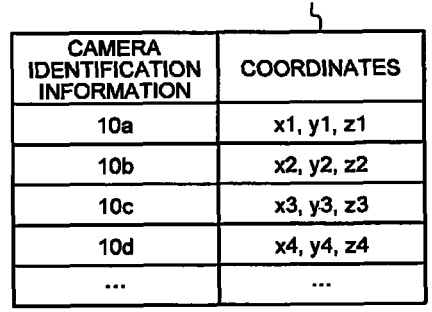
FIG. 6 is a diagram illustrating an example of the data structure of camera position parameters.

FIG. 6 is a diagram illustrating one example of the data structure of the camera position parameters $110a$. As illustrated in FIG. 6, the camera position parameters $110a$ include the identification information of each camera stored in association with its coordinates. For example, the user measures the coordinates of the cameras $10a$ to $10d$ in advance and stores the camera position parameters $110a$ in the parameter storage unit 110 using an input unit (not illustrated).

Figure 7:
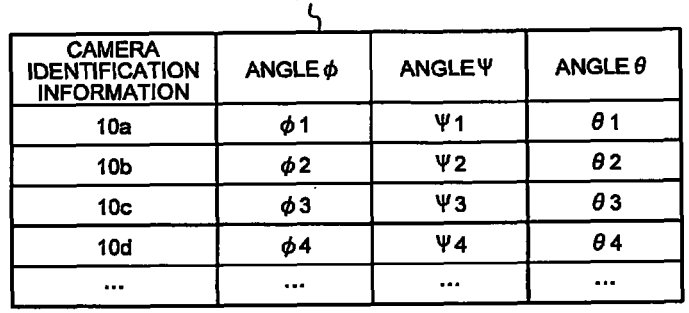
FIG. 7 is a diagram illustrating an example of the data structure of camera angle parameters.

FIG. 7 is a diagram illustrating an example of the data structure of the camera angle parameters $110b$. As illustrated in FIG. 7, the camera angle parameters $110b$ include the identification information of each camera stored in association with its rotation angles $\phi$, $\psi$, and $\theta$. The camera angle parameters $110b$ are computed by the camera angle parameter estimation unit 150. The camera angle parameter estimation unit 150 will be described later.

Figure 8:
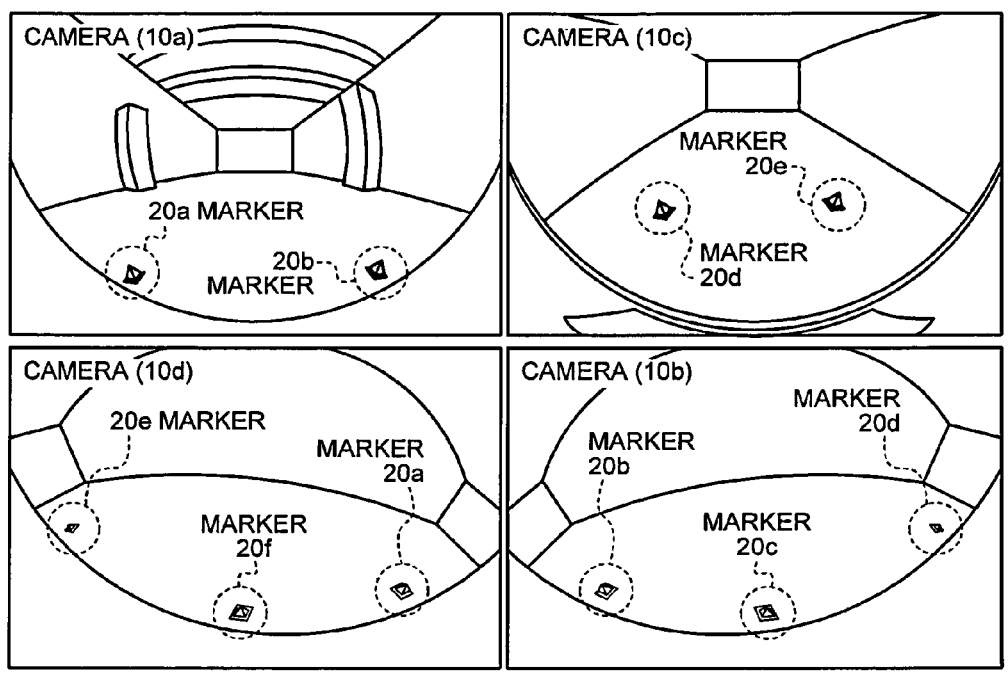
FIG. 8 is a diagram illustrating examples of the images captured by the cameras.

The frame buffer 120 is a storage unit that sequentially stores the images captured by the cameras $10a$ to $10d$. FIG. 8 is a diagram illustrating examples of the images captured by the cameras $10a$ to $10d$. As illustrated in the upper left in FIG. 8, the image captured by the camera $10a$ contains the markers $20a$ and $20b$. As illustrated in the upper right in FIG. 8, the image captured by the camera $10c$ contains the markers $20d$ and $20e$.

As illustrated in the lower left in FIG. 8, the image captured by the camera $10d$ contains the markers $20e$, $20f$, and $20a$. As illustrated in the lower right in FIG. 8, the image captured by the camera $10b$ contains the markers $20b$, $20c$, and $20d$.

The marker extraction unit 130 is a processing unit that acquires the data of the images captured by the cameras $10a$ to $10d$ from the frame buffer 120, extracts the markers contained in the images, and then determines the coordinates of the extracted markers on the images. Any known image processing technique may be used as the method of extracting the markers contained in the images.

Figure 9:
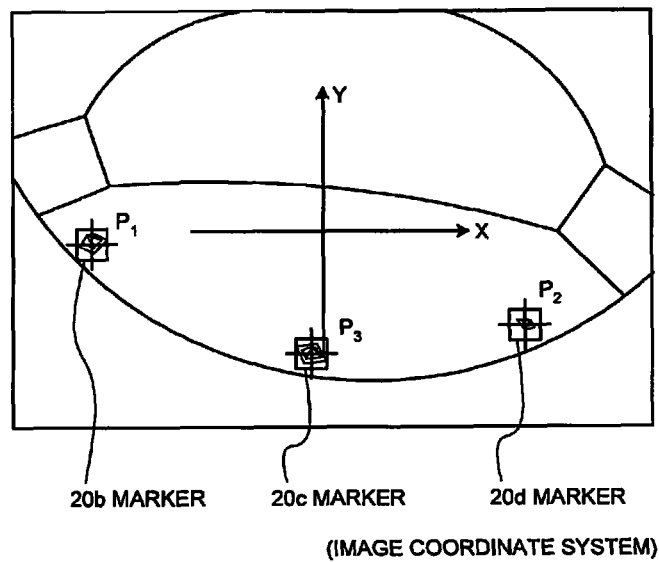
FIG. 9 is a diagram illustrating the results of extraction of markers by a marker extraction unit.

FIG. 9 is a diagram illustrating the results of extraction of markers by the marker extraction unit 130. If it is assumed that the image illustrated in FIG. 9 is captured by the camera $10b$, then the marker extraction unit 130 extracts the coordinates of the markers 20b, 20c, and 20d as $P_1$, $P_2$, and $P_3$ in an image coordinate system. The marker extraction unit 130 also determines the coordinates of the markers in the images captured by the cameras 10a, 10b, and 10c (the coordinates in image coordinate systems). The marker extraction unit 130 outputs the determined coordinates of each marker to the marker position estimation unit 140.

To allow the marker extraction unit 130 to easily extract the positions of the markers, steady/flashing LEDs (Light Emitting Diodes), for example, may be disposed as the markers. In such a case, the marker extraction unit 130 may have a function of recognizing a set of clustered flashing pixels having the same light-emitting pattern as a single marker. Alternatively, the marker extraction unit 130 may display an image on the display 170, and the user may input the coordinates of markers on the image using a pointing device to notify the marker extraction unit 130 of the coordinates of the markers.

The marker position estimation unit 140 is a processing unit that computes the coordinates of the markers 20a to 20f in the vehicle coordinate system from the coordinates of the markers 20a to 20f (the coordinates in the image coordinate systems) and the camera position parameters 110a (see FIG. 6) and also computes the optical axis vectors R and vertical vectors D of the cameras 10a to 10d in the vehicle coordinate system. The camera angle parameters of the cameras 10a to 10d can be computed using these optical axis vectors and vertical vectors.

The processing used in the marker position estimation unit 140 will be specifically described. First, the marker position estimation unit 140 compares the coordinates of the markers 20a to 20f (the coordinates in the image coordinate systems) with coordinates in a conversion table to determine the line-of-sight vectors to the coordinate points of the markers. The line-of-sight vector is a direction vector of a line segment extending from the optical center of a camera to the coordinate point of a marker and is oriented in a direction from the camera to the marker.

Figures 10, 11:
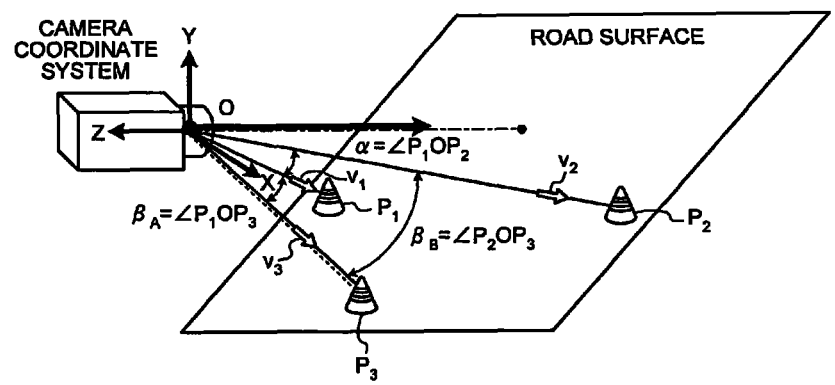
FIG. 10 is a diagram illustrating an example of the data structure of a conversion table.
FIG. 11 is a diagram illustrating the computation of the angles between line-of-sight vectors.

The conversion table is a table used to convert the coordinates on the image captured by a camera to a line-of-sight vector, and the relationships between coordinate points and line-of-sight vectors are pre-computed from the characteristic values of the cameras and the lens systems. The conversion table is stored in the marker position estimation unit 140. FIG. 10 illustrates an example of the data structure of the conversion table.

Next, the marker position estimation unit 140 computes the angles between the line-of-sight vectors in each camera coordinate system. FIG. 11 is a diagram illustrating the computation of the angles between line-of-sight vectors. In this example, the markers are denoted by $P_1$ to $P_3$ ($P_3$ is a marker vertically below a camera), and the line-of-sight vectors to the markers are denoted by $v_1$ to $v_3$. The angle formed between the line-of-sight vectors to markers is computed by $$\arccos(v_m \cdot v_n) \tag{1}$$

Herein, the symbol "·" in this Equation (1) denotes the inner product of vectors.

Using Equation (1), the angle $\alpha$ ($\angle P_1 O P_2$) formed between $P_1$ and $P_2$, the angle $\beta_A$ ($\angle P_1 O P_3$) formed between $P_1$ and $P_3$, and the angle $\gamma_B$ ($\angle P_2 O P_3$) formed between $P_2$ and $P_3$ in the camera coordinate system are computed from the image captured by the camera 10d or 10b. The images captured by the cameras 10a and 10c do not contain the marker $P_3$, and therefore only the angle $\alpha$ formed between $P_1$ and $P_2$ is computed.

In the following description, the angle a for the camera 10a is denoted by $\alpha_1$, the angle $\alpha$ for the camera 10b is denoted by $\alpha_2$, the angle $\alpha$ for the camera 10c is denoted by $\alpha_3$, and the angle $\alpha$ for the camera 10d is denoted by $\alpha_4$. The angles $\beta_A$ and $\beta_B$ for the camera 10b are denoted by $\beta_{2A}$ and $\beta_{2B}$, respectively, and the angles $\beta_A$ and $\beta_B$ for the camera 10d are denoted by $\beta_{4A}$ and $\beta_{4B}$, respectively.

Next, the marker position estimation unit 140 determines the coordinates $M_1$ to $M_4$ of the markers 20a to 20f in the vehicle coordinate system using an evaluation function of $$\begin{aligned}F(M_1, M_2, M_3, M_4) &= (\alpha_1 - \angle M_1 C_1 M_2)^2 + (\alpha_2 - \angle M_2 C_2 M_3)^2 + (\alpha_3 - \angle M_3 C_3 M_4)^2 + (\alpha_4 - \angle M_4 C_4 M_1)^2 \\ &+ K\{(\beta_{2A} - \angle M_2 C_2 N_2) + (\beta_{2B} - \angle M_3 C_2 N_2)2 \\ &+ (\beta_{4A} - \angle M_4 C_4 N_4)2 + (\beta_{4B} - \angle M_1 C_4 N_4)^2\}\end{aligned} \tag{2}$$

In this Equation (2), $M_1$ is the coordinates of the marker 20a in the vehicle coordinate system, and $M_1 = (m_{1x}, m_{1y}, 0)$. $M_2$ is the coordinates of the marker 20b in the vehicle coordinate system, and $M_2 = (m_{2x}, m_{2y}, 0)$. $M_3$ is the coordinates of the marker 20d in the vehicle coordinate system, and $M_3 = (m_{3x}, m_{3y}, 0)$. $M_4$ is the coordinates of the marker 20e in the vehicle coordinate system, and $M_4 = (m_{4x}, m_{4y}, 0)$.

In Equation (2), $N_2$ is the coordinates of the marker 20c in the vehicle coordinate system, and $N_2 = (c_{2x}, c_{2y}, 0)$. $N_4$ is the coordinates of the marker 20f in the vehicle coordinate system, and $N_4 = (c_{4x}, c_{4y}, 0)$. Since the markers 20a to 20f are placed on the ground, the z components of $M_1$ to $M_4$, $N_2$, and $N_4$ are "0".

In Equation (2), $C_1$ is the coordinates of the camera 10a in the vehicle coordinate system, and $C_1 = (c_{1x}, c_{1y}, c_{1z})$. $C_2$ is the coordinates of the camera 10b in the vehicle coordinate system, and $C_2 = (c_{2x}, c_{2y}, c_{2z})$. $C_3$ is the coordinates of the camera 10c in the vehicle coordinate system, and $C_3 = (c_{3x}, c_{3y}, c_{3z})$. $C_4$ is the coordinates of the camera 10d in the vehicle coordinate system, and $C_4 = (c_{4x}, c_{4y}, c_{4z})$.

Figure 12:
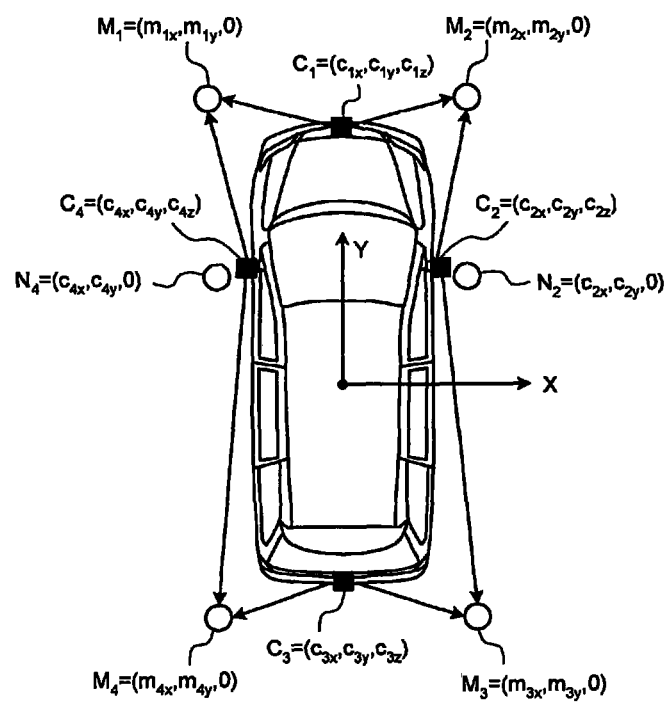
FIG. 12 is a diagram illustrating the coordinates of cameras and the coordinates of markers in a vehicle coordinate system.

Since the marker 20c is disposed vertically below the camera 10b, the x and y components of $C_2$ and $N_2$ are equal to each other. Since the marker 20f is disposed vertically below the camera 10d, the x and y components of $C_4$ and $N_4$ are equal to each other. K in Equation (2) is a constant. FIG. 12 is a diagram illustrating the coordinates $C_1$ to $C_4$ of the cameras 10a to 10d and the coordinates $M_1$ to $M_4$, $N_2$, and $N_4$ of the markers 20a to 20f in the vehicle coordinate system.

The marker position estimation unit 140 computes $M_1$ to $M_4$ that give a minimum value of the evaluation function $F(M_1, M_2, M_3, M_4)$ represented by Equation (2). For example, the marker position estimation unit 140 computes $M_1$ to $M_4$ by assigning initial values to $M_1$ to $M_4$ and then determining $M_1$ to $M_4$ that make the evaluation function $F(M_1, M_2, M_3, M_4)$ equal to 0 (or as close to 0 as possible) using the well-known steepest descent method. The values of the coordinates $C_1$ to $C_4$ of the cameras 10a to 10d and the value of $N_2$ and $N_4$ contained in Equation (2) are known, and the values in the camera position parameters 110a are used.

The marker position estimation unit 140 outputs the information of the coordinates $M_1$ to $M_4$ of the markers 20a to 20f in the vehicle coordinate system to the camera angle parameter estimation unit 150.

The camera angle parameter estimation unit 150 is a processing unit that acquires the coordinates $M_1$ to $M_4$ of the markers 20a to 20f and then computes the camera angle parameters of the cameras 10a to 10d from the acquired coordinates $M_1$ to $M_4$. The processing in the camera angle parameter estimation unit 150 will next be specifically described.

Figure 13:
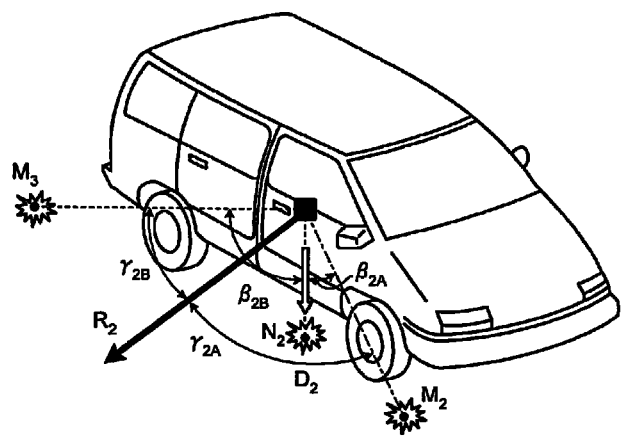
FIG. 13 is a diagram (1) illustrating processing in a camera angle parameter estimation unit.
Figure 14:
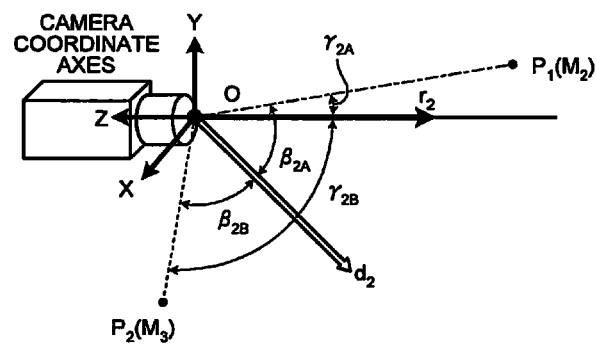
FIG. 14 is a diagram (2) illustrating the processing in the camera angle parameter estimation unit.

FIGS. 13 and 14 are diagrams illustrating the processing in the camera angle parameter estimation unit 150. First, the camera angle parameter estimation unit 150 computes the optical axis vectors $R_n$ (n=1, 2, 3, and 4: see FIG. 13) of the cameras in the vehicle coordinate system and the vertical vectors $d_n$ (n=1, 2, 3, 4: see FIG. 14) of the cameras in their camera coordinate systems from the coordinates $M_1$ to $M_4$ of the cameras 10a to 10d. The optical axis vectors $R_1$ to $R_4$ correspond to the optical axis vectors of the cameras 10a to 10d, respectively, and the vertical vectors $d_1$ to $d_4$ correspond to the vertical vectors of the cameras 10a to 10d, respectively.

In FIG. 13, $D_n$ (n=1, 2, 3, 4) represents a vertical vector in the vehicle coordinate system. $\gamma_{nA}$ (n=1, 2, 3, 4) represents the angle formed between the optical axis vector $R_n$ and a vector from a camera to the coordinate point of a marker, and $\gamma_{nB}$ (n=1, 2, 3, 4) represents the angle formed between the optical axis vector $R_n$ and a vector from the camera to the coordinate point of another marker. For example, in FIG. 13, which focuses on the camera 10b, $\gamma_{2A}$ represents the angle formed between a vector from the camera 10b to the coordinate point $M_2$ and the optical axis vector $R_n$, and $\gamma_{2B}$ represents the angle formed between a vector from the camera 10b to the coordinate point $M_3$ and the optical axis vector $R_n$.

In FIG. 13, $\beta_{nA}$ (n=1, 2, 3, 4) represents the angle formed between a vector from a camera to the coordinate point of a marker and the vertical vector $d_n$, and $\beta_{nB}$ (n=1, 2, 3, 4) represents the angle formed between a vector from the camera to the coordinate point of another marker and the vertical vector $d_n$. For example, in FIG. 13, which focuses on the camera 10b, $\beta_{2A}$ represents the angle formed between a vector from the camera 10b to the coordinate point $M_2$ and the vertical vector $D_n$, and $\beta_{2A}$ represents the angle formed between a vector from the camera 10b to the coordinate point $M_3$ and the vertical vector $D_n$.

In FIG. 13, the vectors from the camera to the coordinate points of the markers in the vehicle coordinate system are converted from the coordinate points of the markers in the vehicle coordinate system using, for example, a conversion table.

In FIG. 14, $r_n$ (n=1, 2, 3, 4) represents the optical axis vector of a camera in its camera coordinate system, $\gamma_{nA}$ (n=1, 2, 3, 4) represents the angle formed between a line-of-sight vector $v_1$ and the optical axis vector $r_n$, and $\gamma_{nB}$ (n=1, 2, 3, 4) represents the angle formed between a line-of-sight vector $v_2$ and the optical axis vector $r_n$. $\beta_{nA}$ (n=1, 2, 3, 4) represents the angle formed between the line-of-sight vector $v_1$ and a vertical vector $d_n$, and $\beta_{nB}$ (n=1, 2, 3, 4) represents the angle formed between the line-of-sight vector $v_2$ and the vertical vector $d_n$.

The values of $\gamma_{nA}$, $\gamma_{nB}$, $\beta_{nA}$, and $\beta_{nB}$ in the vehicle coordinate system are equal to the values of $\gamma_{nA}$, $\gamma^{nB}$, $\beta_{nA}$, and $\beta_{nB}$ in a camera coordinate system. For example, the values of $\gamma_{2A}$, $\gamma_{2B}$, $\beta_{2A}$, and $\beta_{2B}$ in FIG. 13 are equal to the values of $\gamma_{2A}$, $\gamma_{2B}$, $\beta_{2A}$, and $\beta_{nB}$ in FIG. 14. Next, a description will be given of an example in which the camera angle parameter estimation unit 150 computes the optical axis vector $R_2$ and the vertical vector $d_2$ of the camera 10b.

In FIG. 14, the optical axis vector in the camera coordinate system is known as $r_2$=(0, 0, −1). Therefore, the camera angle parameter estimation unit 150 computes $\gamma_{2A}$ and $\gamma_{2B}$ from the optical axis vector $r_2$ and the line-of-sight vectors using Equation (1). The computed $\gamma_{2A}$ and $\gamma_{2B}$ are valid also in the vehicle coordinate system illustrated in FIG. 13. Therefore, an appropriate vector is selected as $R_2$ from vectors satisfying angular relationships $\gamma_{2A}$ and $\gamma_{2B}$ with respect to the direction vectors from the lens of the camera 10b to the markers $M_2$ and $M_2$. Generally, two vectors satisfy the angular relationships. However, one vector can be determined from the relationship between the camera and the ground.

In FIG. 13, the vertical vector in the vehicle coordinate system is known as D2=(0, 0, −1). Therefore, the camera angle parameter estimation unit 150 computes $P_{2A}$ and $\beta_{2B}$ from the vertical vector D and direction vectors (the direction vector from the lens of the camera 10d to the marker $M_2$ and the direction vector from the lens of the camera 10d to the marker $M_3$) using Equation (1). Since the computed $\beta_{2A}$ and $\beta_{2B}$ are valid also in the camera coordinate system illustrated in FIG. 14, a vector satisfying the angular relationships with the line-of-sight vectors is selected as $d_2$.

The camera angle parameter estimation unit 150 computes the optical axis vectors $R_n$ (n=1, 2, 3, 4) and the vertical vectors $d_n$ (n=1, 2, 3, 4) of the cameras 10a to 10d using the method illustrated in FIGS. 13 and 14. In the case where a marker is disposed vertically below a camera as in the cameras 10b and 10d, the vertical vector $d_n$ is identical to the line-of-sight vector to the marker disposed vertically below the camera and therefore is not necessarily computed using the above method.

After computation of the optical axis vectors $R_n$ and the vertical vectors $d_n$ of the cameras 10a to 10d, the camera angle parameter estimation unit 150 computes the camera angle parameters using $$\theta_n = \arctan 2(-R_{nx}, R_{ny}) \tag{3}$$

$$\psi_n = \pi/2 - \arccos((0, 0, -1) \cdot R_n) \tag{4}$$

$$\phi_n = -\arctan 2(d_{nx}, -d_{ny}) \tag{5}$$

After computation of the camera angle parameters, the camera angle parameter estimation unit 150 stores the camera angle parameters in the parameter storage unit 110.

The image combining processing unit 160 is a processing unit that acquires the images captured by the cameras 10a to 10d from the frame buffer 120, combines the acquired images, and outputs the combined images to the display 170. FIG. 15 is a diagram illustrating examples of the images outputted from the image combining processing unit 160. If the image combining processing unit 160 combines images using the initial values of the camera angle parameters without any modification, the image displayed on the display is skewed, as illustrated in the upper image in FIG. 15 (for example, if the rotation angle φ has an error).

Therefore, the image combining processing unit 160 corrects the errors in the camera angle parameters using the camera angle parameters 110b stored in the parameter storage unit 110, and then combines the images. In this manner, the combined image can be appropriately displayed, as illustrated in the lower image in FIG. 15.

Figure 16:
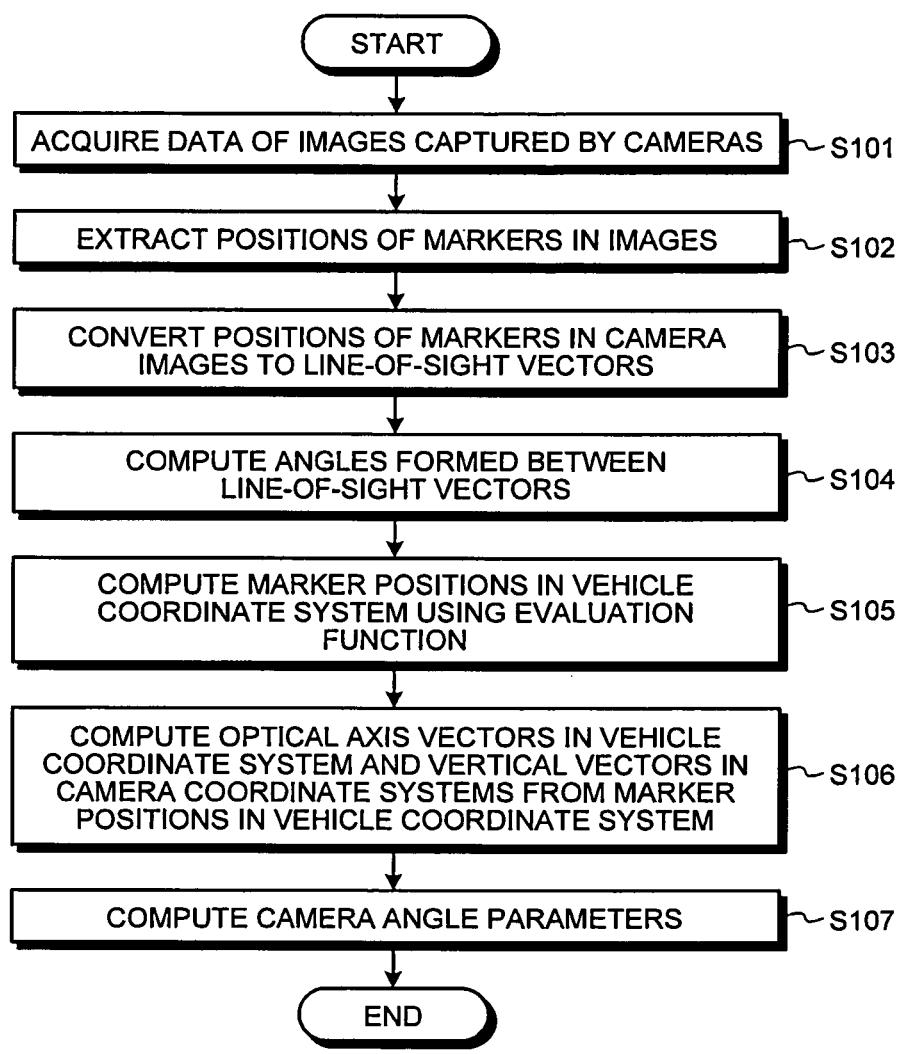
FIG. 16 is a flow chart illustrating a processing procedure in the calibration device according to the first embodiment.

The processing procedure in the calibration device 100 according to the first embodiment will next be described. FIG. 16 is a flow chart illustrating the processing procedure in the calibration device 100 according to the first embodiment. As illustrated in FIG. 16, in the calibration device 100, the marker extraction unit 130 acquires the data of the images captured by the cameras 10a to 10d (step S101) and then extracts the positions of the markers in the images (step S102).

The marker position estimation unit 140 converts the positions of the markers in the camera images to line-of-sight vectors (step S103), computes the angles formed between the line-of-sight vectors (step S104), and computes the marker positions $M_1$ to $M_4$ in the vehicle coordinate system using the evaluation function (step S105).

Then the camera angle parameter estimation unit 150 computes the optical axis vectors in the vehicle coordinate system and the vertical vectors in the camera coordinate systems from the marker positions $M_1$ to $M_4$ in the vehicle coordinate system (step 5106) and computes the camera angle parameters 110b (step S107).

As described above, in the calibration device 100 according to the first embodiment, the camera angle parameters of the cameras 10a to 10d installed in the vehicle are computed using images containing the markers 20a, 20b, 20d, and 20e disposed in overlap regions of the image capturing ranges of adjacent cameras and the markers 20c and 20f disposed vertically below cameras. Therefore, the area required for camera calibration can be reduced (the placement areas of the markers can be reduced), and the camera angle parameters can be computed accurately.

[b] Second Embodiment

Although the embodiment of the present invention has been described, the invention may be embodied in various modes other than the first embodiment. Other modes included in the present invention as a second embodiment will next be described.

(1) Markers Vertically Below Cameras

For example, in the first embodiment above, the markers 20c and 20f are disposed vertically below the cameras 10b and 10d, respectively, but the present invention is not limited thereto. Instead of disposing the markers 20c and 20f vertically below the cameras 10b and 10d, the user may hang weights with strings from the cameras 10b and 10d. By hanging the weights with strings from the cameras 10b and 10d, the weights spontaneously move to the positions vertically below the cameras 10b and 10d. This can reduce the load on the user.

(2) Capturing of Images of Markers

The image capturing timing in the cameras 10a to 10d is not described in the first embodiment. Not all the camera images required for calibration may be captured simultaneously. For example, the calibration device 100 may capture the images of markers in divided image capturing ranges and then combine the images. Then the calibration device 100 computes the camera angle parameters in the same manner as in the first embodiment.

Figure 17:
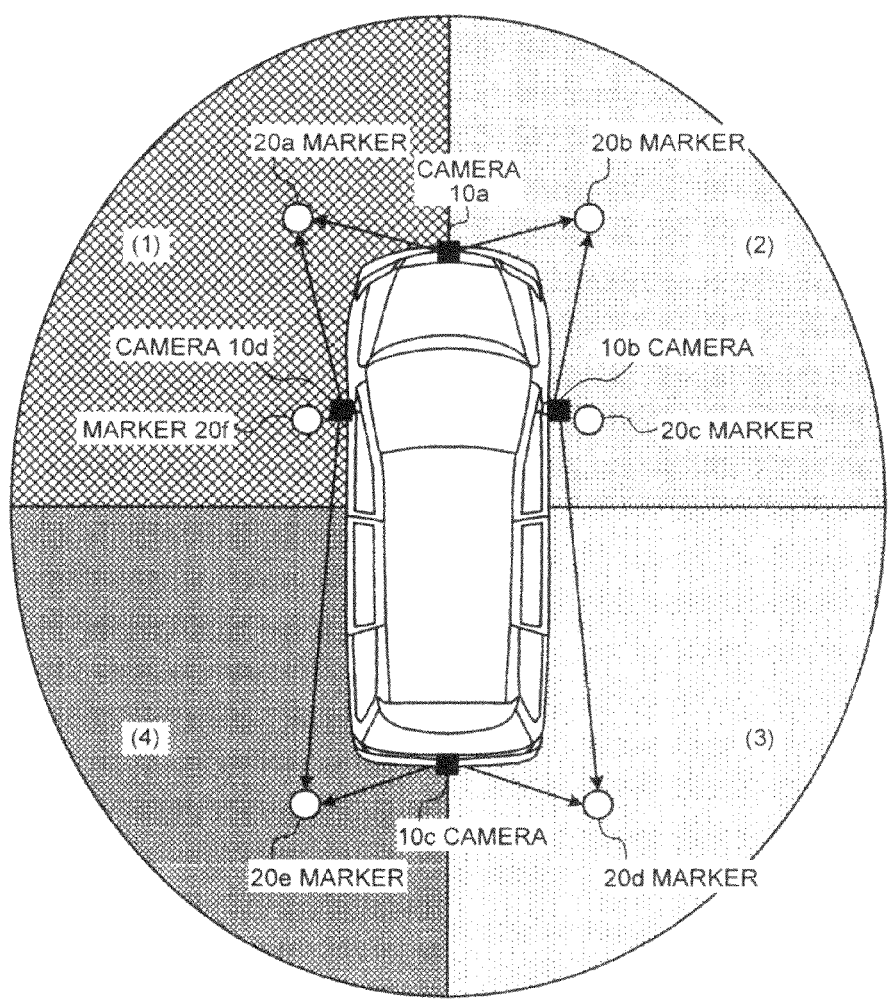
FIG. 17 is a diagram illustrating the split capturing of the images of the markers.

FIG. 17 is a diagram illustrating the split capturing of the images of the markers. As illustrated in FIG. 17, the calibration device captures the images of the markers in regions (1) to (4) in this order. The markers 20a to 20f are disposed when the images of the corresponding regions are captured. In other words, when the image of region (1) is captured, jigs may not be disposed in regions (2) and (3).

More specifically, the calibration device captures the images of region (1) using the cameras 10a and 10d. The marker 20a is disposed in region (1) when the images are captured, and the cameras 10a and 10d capture the images of the marker 20a.

Next, the calibration device captures the images of region (2) using the cameras 10a and 10b. The marker 20b is disposed in region (2) when the images are captured, and the cameras 10a and 10b capture the images of the marker 20b.

Then the calibration device captures the images of region (3) using the cameras 10b and 10c. The markers 20c and 20d are disposed in region (3) when the images are captured. The camera 10b captures the image of the marker 20c, and the camera 10c captures the image of the marker 20d.

Next, the calibration device captures the images of region (4) using the cameras 10c and 10d. The markers 20e and 20f are disposed in region (4) when the images are captured. The cameras 10c and 10d capture the images of the marker 20e, and the camera 10d captures the image of the marker 20f.

Figure 18:
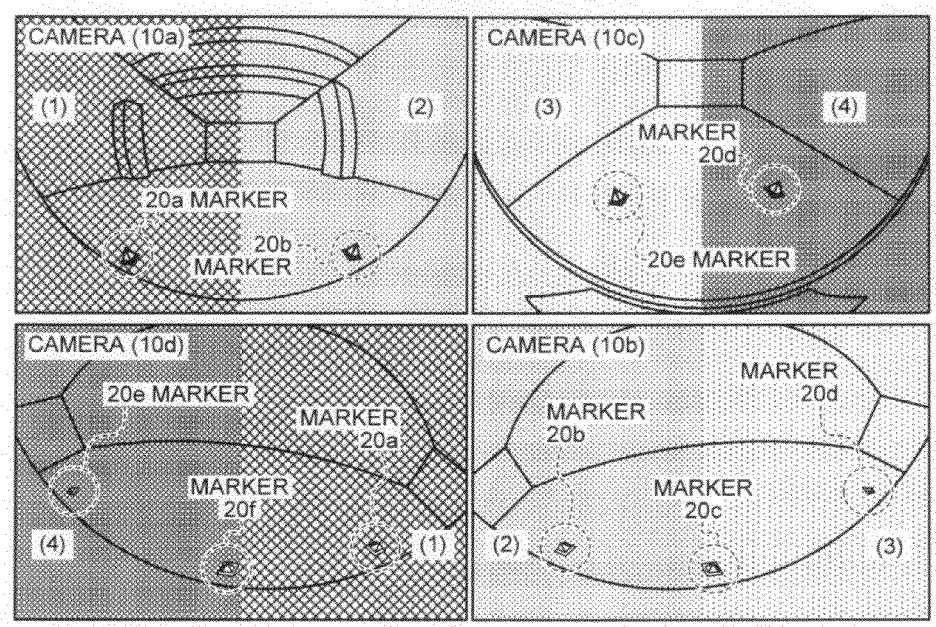
FIG. 18 is a diagram illustrating the combining of camera images.

The calibration device combines camera images for each region illustrated in FIG. 17. FIG. 18 is a diagram illustrating the combining of the camera images. The upper left image in FIG. 18 is an image obtained by combining the image of the marker 20a in region (1) captured by the camera 10a and the image of the marker 20b in region (2) captured also by the camera 10a. By combining the images in the above manner, the same image as the image obtained by simultaneously capturing the marker 20a in region (1) and the marker 20b in region (2) can be obtained as in the first embodiment.

The upper right image in FIG. 18 is an image obtained by combining the image of the marker 20d in region (3) captured by the camera 10c and the image of the marker 20e in region (4) captured also by the camera 10c. By combining the images in the above manner, the same image as the image obtained by simultaneously capturing the marker 20d in region (3) and the marker 20e in region (4) can be obtained as in embodiment 1.

The lower right image in FIG. 18 is an image obtained by combining the image of the marker 20b in region (2) captured by the camera 10b and the image of the markers 20c and 20d in region (3) captured also by the camera 10b. By combining the images in the above manner, the same image as the image obtained by simultaneously capturing the marker 20b in region (2) and the markers 20c and 20d in region (3) can be obtained as in the first embodiment.

The lower left image in FIG. 18 is an image obtained by combining the image of the marker 20a in region (1) captured by the camera 10d and the image of the markers 20e and 20f in region (4) captured also by the camera 10d. By combining the images in the above manner, the same image as the image obtained by simultaneously capturing the marker 20a in region (1) and the markers 20e and 20f in region (4) can be obtained as in the first embodiment.

After the combined images illustrated in FIG. 18 are produced, the calibration device computes the camera angle parameters of the cameras 10a to 10d in the same manner as in the first embodiment. As described above, with the calibration device according to the second embodiment, the images of regions (1) to (4) are sequentially captured. Therefore, the space required for camera calibration can be further reduced.

Figure 19:
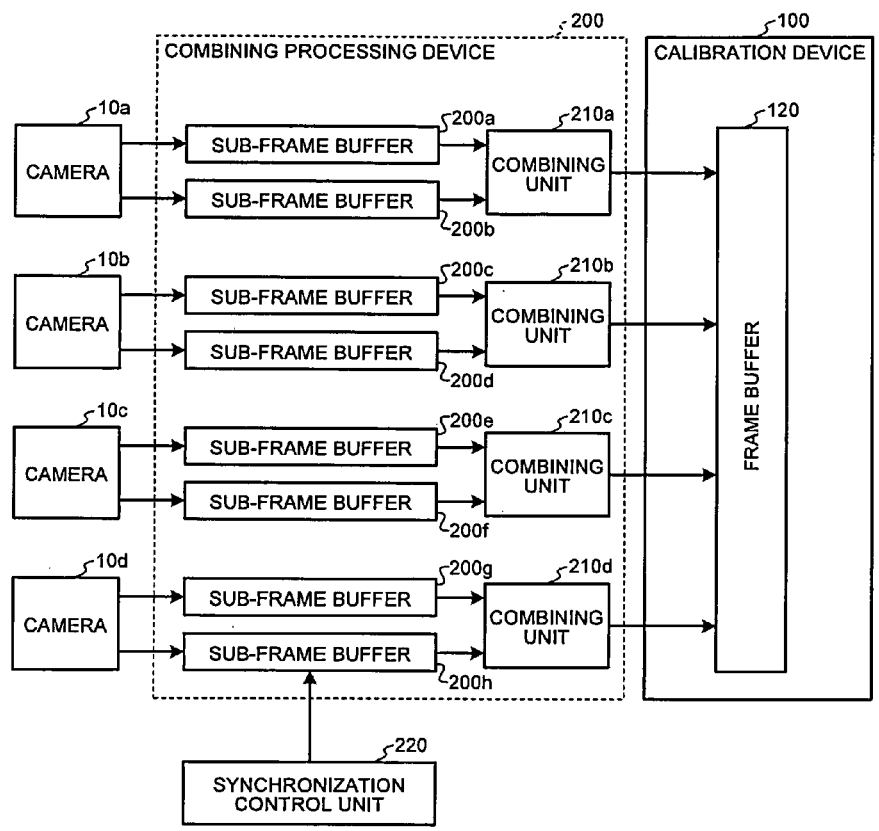
FIG. 19 is a diagram illustrating the configuration of a calibration device according to a second embodiment.

A description will next be given of the configuration of the calibration device that computes the camera angle parameters of the cameras 10a to 10d using the method described in FIGS. 17 and 18. FIG. 19 is a diagram illustrating the configuration of the calibration device according to the second embodiment. As illustrated in FIG. 19, a combining processing device 200 is disposed between the calibration device 100 and cameras 10a to 10d. The configuration of this calibration device 100 is identical to the configuration of the calibration device 100 illustrated in FIG. 5.

The combining processing device 200 is a device for combining images captured by the cameras 10a to 10d at different times and includes sub-frame buffers 200a to 200h and combining units 210a to 210d. The combining processing device 200 is synchronized by a synchronization control unit 220.

The sub-frame buffer 200a is a storage unit that stores the left half of the image (the image containing the marker 20a in region (1)) captured by the camera 10a, and the sub-frame buffer 200b is a storage unit that stores the right half of the image (the image containing the marker 20b in region (2)) captured by the camera 10a.

The sub-frame buffer 200c is a storage unit that stores the left half of the image. (the image containing the marker 20b in region (2)) captured by the camera 10b, and the sub-frame buffer 200d is a storage unit that stores the right half of the image (the image containing the markers 20c and 20d in region (3)) captured by the camera 10b.

The sub-frame buffer 200e is a storage unit that stores the left half of the image (the image containing the marker 20d in region (3)) captured by the camera 10c, and the sub-frame buffer 200f is a storage unit that stores the right half of the image (the image containing the marker 20e in region (4)) captured by the camera 10c.

The sub-frame buffer 200g is a storage unit that stores the left half of the image (the image containing the markers 20e and 20f in region (4)) captured by the camera 10d, and the sub-frame buffer 200h is a storage unit that stores the right half of the image (the image containing the marker 20a in region (1)) captured by the camera 10d.

The combining unit 210a is a processing unit that combines the images stored in the sub-frame buffers 200a and 200b. The image combined by the combining unit 210a corresponds to, for example, the upper left image in FIG. 18. The combining unit 210a stores the combined image in the frame buffer 120 of the calibration device 100.

The combining unit 210b is a processing unit that combines the images stored in the sub-frame buffers 200c and 200d. The image combined by the combining unit 210b corresponds to, for example, the lower right image in FIG. 18. The combining unit 210b stores the combined image in the frame buffer 120 of the calibration device 100.

The combining unit 210c is a processing unit that combines the images stored in the sub-frame buffers 200e and 200f. The image combined by the combining unit 210c corresponds to, for example, the upper right image in FIG. 18. The combining unit 210c stores the combined image in the frame buffer 120 of the calibration device 100.

The combining unit 210d is a processing unit that combines the images stored in the sub-frame buffers 200g and 200h. The image combined by the combining unit 210d corresponds to, for example, the lower left image in FIG. 18. The combining unit 210d stores the combined image in the frame buffer 120 of the calibration device 100.

(3) System Configuration Etc.

Of the processes described in the above embodiments, processes described as automatic processes may be executed manually in part or in whole, and processes described as manual processes may be executed automatically in part or in whole using known methods. In addition, the processing procedures, control procedures, specific names, information including various types of data and various parameters illustrated in the above description and the drawings may be freely modified, unless otherwise specifically mentioned.

The components of each device illustrated in the figures are conceptual and functional and are not necessarily configured physically in the manner illustrated in the figures. More specifically, the specific configuration of the distribution and integration of each device is not limited to those illustrated in the figures. A part of or all the constituent components may be freely distributed or integrated functionally or physically according to various loads, use conditions, and other factors. Moreover, any part of or all the various processing functions executed on each unit may be implemented on a CPU as programs analyzed and executed on the CPU or implemented as a wired logic hardware device.

Figure 20:
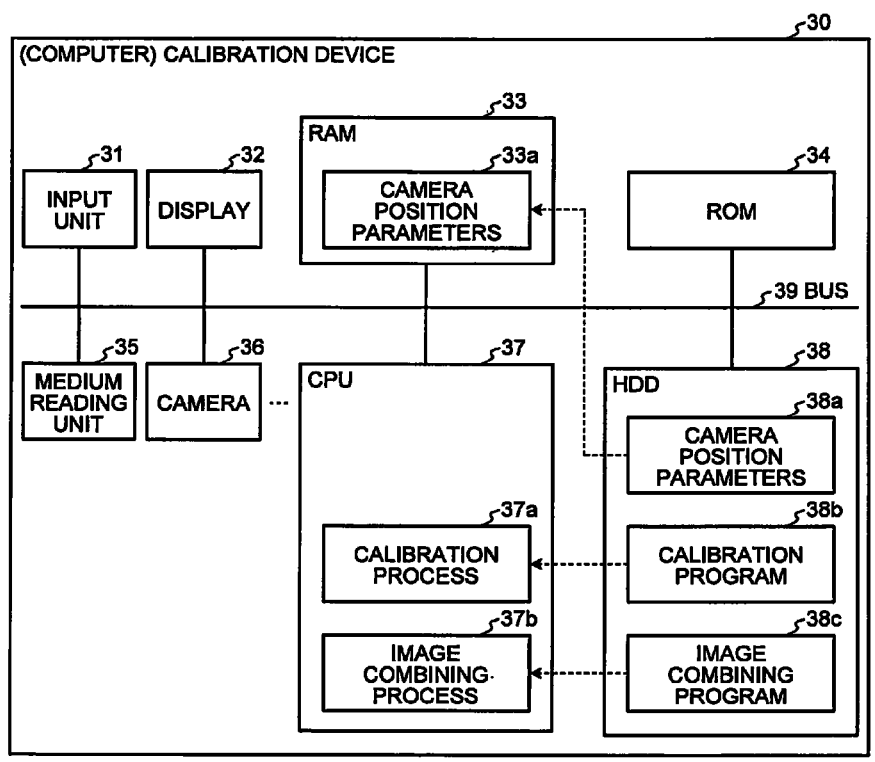
FIG. 20 is a diagram illustrating the hardware configuration of a computer that forms any of the calibration devices in the embodiments.

FIG. 20 is a diagram illustrating the hardware configuration of a computer that forms the calibration device 100 in the embodiments. As illustrated in FIG. 20, a computer (calibration device) 30 includes an input unit 31, a display 32, a random access memory (RAM) 33, a read only memory (ROM) 34, a medium reading unit 35 for reading data from a recording medium, a camera 36, a central processing unit (CPU) 37, and a hard disk drive (HDD) 38, which are connected via a bus 39. The computer 30 further includes cameras other than the camera 36.

A calibration program 38b and an image combining program 38c that have the same functions as those of the calibration device 100 described above are pre-stored in the HDD 38. The CPU 37 reads and executes the calibration program 38b and the image combining program 38c, and a calibration process 37a and an image combining process 37b are thereby started. The calibration process 37a corresponds to the marker extraction unit 130, the marker position estimation unit 140, and the camera angle parameter estimation unit 150 illustrated in FIG. 5, and the image combining process 37b corresponds to the image combining processing unit 160.

The HDD 38 also stores camera position parameters 38a corresponding to the information stored in the parameter storage unit 110. The CPU 37 reads the camera position parameters 38a stored in the HDD 38, stores the read parameters in the RAM 33, computes the camera angle parameters using the camera position parameters 38a stored in the RAM 33 and the images captured by the camera 36, and then combines the images using the computed camera angle parameters and the camera position parameters 38a.

The calibration program 38b and the image combining program 38c illustrated in FIG. 20 are not necessarily pre-stored in the HDD 38. For example, the calibration program 38b and the image combining program 38c may be stored in a "mobile physical medium" to be inserted into the computer such as a flexible disk (FD), a CD-ROM, a DVD disk, a magneto-optical disk, or an IC card, a "fixed physical medium" such as an internal or external hard disk drive (HDD) of the computer, or "another computer (or server)" connected to the computer via a public network, the Internet, a LAN, a WAN, etc. The computer may read the calibration program 38b and the image combining program 38c from such a medium or computer and execute the read programs.

In this camera angle computing device, an image containing a first jig disposed in an overlap region of the fields of view of a camera and an adjacent camera and a second jig disposed vertically below the camera is acquired, and the angles of the camera are computed from the coordinates of the first and second jigs contained in the acquired image. Therefore, the area necessary for the calibration of the camera can be reduced, and the angle parameters of the camera can be computed accurately.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A car-mounted camera angle computing device comprising:
   an image acquiring unit that acquires an image containing a first jig disposed in an overlap region of an image capturing range of a camera and an image capturing range of an adjacent camera and a second jig disposed vertically below the camera; and
   an angle computing unit that computes coordinates of the first jig and the second jig in a vehicle coordinate system to minimize a value of an evaluation function which evaluates a difference between a first angle and a second angle, the first angle being between a first line-of-sight vector and a second line-of-sight vector, the first line-of-sight vector being obtained by coordinates of the first jig in the image, the second line-of-sight vector being obtained by coordinates of the second jig in the image, the second angle being equal to an angle which is obtained by coordinates of the first jig and the second jig in the vehicle coordinate system, and computes an angle of the camera based on the coordinates of the first jig and the second jig in the vehicle coordinate system.

2. The car-mounted camera angle computing device according to claim 1, wherein the adjacent cameras capture the same first jig.

3. The car-mounted camera angle computing device according to claim 1, further comprising image combining unit that stores images captured by each of the cameras at a different time in a storage device and combines the images stored in the storage device into a combined image, and wherein the image acquiring unit acquires the combined image combined by the image combining unit.

4. A car-mounted camera angle computing method performed in a camera angle computing device, the method comprising:
    acquiring an image containing a first jig disposed in an overlap region of an image capturing range of a camera and an image capturing range of an adjacent camera and a second jig disposed vertically below the camera;
    storing the acquired image in a storage device;
    computing coordinates of the first jig and the second jig in a vehicle coordinate system to minimize a value of an evaluation function which evaluates a difference between a first angle and a second angle, the first angle being between a first line-of-sight vector and a second line-of-sight vector, the first line-of-sight vector being obtained by coordinates of the first jig in the image, the second line-of-sight vector being obtained by coordinates of the second jig in the image, the second angle being equal to an angle which is obtained by coordinates of the first jig and the second jig in the vehicle coordinate system; and
    computing an angle of the camera based on the coordinates of the first jig and the second jig in the vehicle coordinate system.

5. The car-mounted camera angle computing method according to claim 4, wherein the adjacent cameras capture the same first jig.

6. The car-mounted camera angle computing method according to claim 4, further comprising:
    storing images captured by each of the cameras at different times in the storage device; and
    combining the images stored in the storage device into a combined image, wherein
    the acquiring includes acquiring the combined image combined at the combining from the storage device.

7. A computer-readable, non-transitory medium storing a car-mounted camera angle computing program causing a computer to execute a process, the process comprising:
    acquiring an image containing a first jig disposed in an overlap region of an image capturing range of a camera and an image capturing range of an adjacent camera and a second jig disposed vertically below the camera;
    storing the acquired image in a storage device;
    computing coordinates of the first jig and the second jig in a vehicle coordinate system to minimize a value of an evaluation function which evaluates a difference between a first angle and a second angle, the first angle being between a first line-of-sight vector and a second line-of-sight vector, the first line-of-sight vector being obtained by coordinates of the first jig in the image, the second line-of-sight vector being obtained by coordinates of the second jig in the image, the second angle being equal to an angle which is obtained by coordinates of the first jig and the second jig in the vehicle coordinate system; and
    computing an angle of the camera based on the coordinates of the first jig and the second jig in the vehicle coordinate system.

8. The computer-readable, non-transitory medium according to claim 7, wherein the adjacent cameras capture the same first jig.

9. The computer-readable, non-transitory medium according to claim 7, wherein the process further comprises:
    storing images captured by each of the cameras at different times in the storage device; and
    combining the images stored in the storage device into a combined image, wherein
    the acquiring includes acquiring the combined image combined at the combining from the storage device.

* * * * *